United States Patent
Peng et al.

(10) Patent No.: US 12,448,310 B2
(45) Date of Patent: Oct. 21, 2025

(54) APPARATUS AND METHOD FOR SYNCHRONOUSLY TREATING SEWAGE AND SLUDGE THROUGH COMBINATION OF STEP-FEED PARTIAL NITRIFICATION AND ANAEROBIC AMMONIA OXIDATION

(71) Applicant: BEIJING UNIVERSITY OF TECHNOLOGY, Beijing (CN)

(72) Inventors: Yongzhen Peng, Beijing (CN); Fangzhai Zhang, Beijing (CN); Zhong Wang, Beijing (CN); Hao Jiang, Beijing (CN); Shang Ren, Beijing (CN); Jingang Qui, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 440 days.

(21) Appl. No.: 17/983,786

(22) Filed: Nov. 9, 2022

(65) Prior Publication Data
US 2023/0071009 A1    Mar. 9, 2023

Related U.S. Application Data

(63) Continuation of application No. PCT/CN2021/126023, filed on Oct. 25, 2021.

(30) Foreign Application Priority Data

Feb. 9, 2021 (CN) .......................... 202110174225.9

(51) Int. Cl.
*C02F 3/00* (2023.01)
*C02F 3/30* (2023.01)
(Continued)

(52) U.S. Cl.
CPC .............. *C02F 3/006* (2013.01); *C02F 3/302* (2013.01); *C02F 3/303* (2013.01); *C02F 3/307* (2013.01);
(Continued)

(58) Field of Classification Search
CPC .......... C02F 3/006; C02F 3/302; C02F 3/303; C02F 3/307; C02F 11/02; C02F 11/04;
(Continued)

(56) References Cited

FOREIGN PATENT DOCUMENTS

| CN | 105776540 A | 7/2016 | |
|---|---|---|---|
| CN | 109095727 A | * 12/2018 | ................ C02F 9/00 |

(Continued)

OTHER PUBLICATIONS

Machine-generated English translation of CN 109095727, generated on Mar. 18, 2025.*

(Continued)

*Primary Examiner* — Fred Prince
(74) *Attorney, Agent, or Firm* — Maschoff Brennan

(57) ABSTRACT

Disclosed is an apparatus and method for synchronously treating sewage and sludge through a step-feed partial nitrification coupling anaerobic ammonia oxidation process, belonging to the biological treatment field. Ammonia rich landfill leachate is firstly pumped into an aerobic reactor to realize partial nitrification process; exogenous surplus sludge coupling with partial nitrification reactor effluent are input to an anoxic reactor together for achieving integrated fermentation and denitrification process; finally, effluent from the anoxic reactor is pumped into an integrated autotrophic nitrogen removal reactor by a step-feed mode, the integrated reactor contains two main running units of aeration and anoxic stirring, ammonia is oxidized into nitrite in aeration stage, and the generated nitrite and ammonia contained in secondary influent are further removed through anammox process which operates stably and reliably, realizes efficient nitrogen removal from landfill leachate without external carbon source addition, and realizes the purpose of exogenous excess sludge reduction simultaneously.

2 Claims, 1 Drawing Sheet

(51) Int. Cl.
*C02F 11/02* (2006.01)
*C02F 11/04* (2006.01)
*C02F 103/06* (2006.01)

(52) U.S. Cl.
CPC .............. *C02F 11/02* (2013.01); *C02F 11/04* (2013.01); *C02F 2103/06* (2013.01); *C02F 2209/005* (2013.01); *C02F 2209/06* (2013.01); *C02F 2209/22* (2013.01); *C02F 2209/225* (2013.01); *C02F 2209/38* (2013.01); *C02F 2209/40* (2013.01); *C02F 2209/44* (2013.01); *C02F 2303/06* (2013.01); *Y02W 10/10* (2015.05)

(58) Field of Classification Search
CPC ............ C02F 2103/06; C02F 2209/005; C02F 2209/06; C02F 2209/22; C02F 2209/225; C02F 2209/38; C02F 2209/40; C02F 2209/44; C02F 2303/06; Y02W 10/10
USPC ................ 210/603, 606, 614, 630, 903, 259
See application file for complete search history.

(56) References Cited

FOREIGN PATENT DOCUMENTS

| | | | | |
|---|---|---|---|---|
| CN | 109485149 | A | | 3/2019 |
| CN | 109574218 | A | | 4/2019 |
| CN | 109721156 | A | | 5/2019 |
| CN | 109867359 | A | * | 6/2019 |
| CN | 109912030 | A | * | 6/2019 ............ C02F 3/1263 |
| KR | 20040018605 | A | | 3/2004 |

OTHER PUBLICATIONS

Machine-generated English translation of CN 105776540, generated on Mar. 18, 2025.*
Machine-generated English translation of CN 109574218, generated on Mar. 18, 2025.*
Machine-generated English translation of CN 109721156, generated on Mar. 18, 2025.*
Machine-generated English translation of KR 20040018605, generated on Mar. 18, 2025.*
Machine-generated English translation of CN 109485149, generated on Mar. 18, 2025.*
Machine-generated English translation of CN 109867359, generated on Mar. 18, 2025.*
Machine-generated English translation of CN 109912030, generated on Mar. 18, 2025.*
International Search Report dated Jan. 6, 2022 as received in application No. PCT/CN2021/126023.
Written Opinion of International Search Report dated Jan. 6, 2022 as received in application No. PCT/CN2021/126023.
Chinese Office Action dated Jan. 5, 2022 as received in application No. 202110174225.9.

* cited by examiner

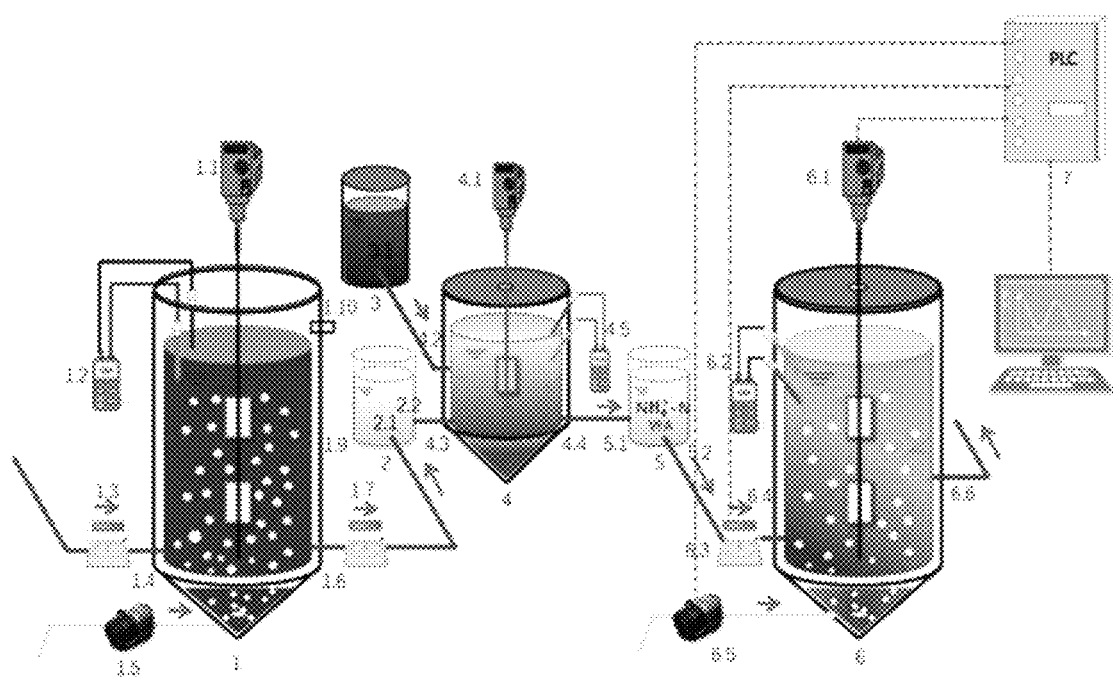

US 12,448,310 B2

APPARATUS AND METHOD FOR SYNCHRONOUSLY TREATING SEWAGE AND SLUDGE THROUGH COMBINATION OF STEP-FEED PARTIAL NITRIFICATION AND ANAEROBIC AMMONIA OXIDATION

TECHNICAL FIELD

The present disclosure relates to an apparatus and method for synchronously treating sewage and sludge through a step-feed partial nitrification coupling anaerobic ammonia oxidation process, which belongs to the biological treatment field. Ammonia rich landfill leachate is firstly pumped into an aerobic sequencing batch reactor to realize partial nitrification process (PN-SBR); exogenous surplus sludge coupled with the PN-SBR effluent are input to an anoxic sequencing batch reactor for achieving integrated fermentation and denitrification process (IFD-SBR); and finally, effluent from the IFD-SBR is pumped into the partial nitrification coupling anaerobic ammonia oxidation reactor (PNA-SBR) by a step-feed mode, the PNA-SBR contains two main running units of aeration and anoxic, ammonia is oxidized into nitrite in aeration stage, and the generated nitrite combined with ammonia contained in secondary influent are further removed through anaerobic ammonia oxidation process (Anammox) in anoxic stage. The process operates stably and reliably, which not only realizes efficient nitrogen removal from landfill leachate without external carbon source addition, but realizes the purpose of exogenous excess sludge reduction simultaneously.

BACKGROUND

At present, the per capita daily output of garbage in Chinese cities is 1.0-1.2 kg, the per capita annual output in Chinese cities is 400 kg, and according to the data of the National Bureau of Statistics, until 2019, China's garbage removal and transportation volume reached 228.54 million tons, ranking first in the world in terms of total garbage volume. In 2025, the global output of solid waste will increase to 2.2 billion tons, the solid waste landfills in the United States and China account for 43% and 58% or above respectively, and in the process of landfilling, 0.05 to 0.2 ton of landfill leachate can be produced per ton of waste. Landfill leachate is a kind of organic wastewater with high concentration of ammonia nitrogen, complex components and extremely poor biochemical performance. If it is not properly disposed, it will pose a great threat to the natural environment and human health. At present, most landfill leachate treatment processes still use a traditional nitrification-denitrification biological nitrogen removal process, but because the traditional process has high requirements for influent carbon sources, it is difficult to effectively treat the landfill leachate with a low C/N ratio.

As a by-product of sewage treatment, China produces 40-60 million tons of surplus sludge every year. However, at present, only 35% of the surplus sludge has been effectively treated. Surplus sludge contains rich organic carbon sources, a fermentation process can release organic matter in the surplus sludge, and once the released organic matter is used by subsequent heterotrophic microorganisms, the two environmental hot issues of "insufficient influent carbon sources" and "large surplus sludge production" will be solved at the same time.

SUMMARY

The present disclosure provides a technology for synchronously treating sewage and sludge through a step-feed partial nitrification coupling anaerobic ammonia oxidation process. Specifically, ammonia rich landfill leachate is firstly pumped into the PN-SBR to realize partial nitrification process; exogenous surplus sludge coupled with the PN-SBR effluent are input to an anoxic reactor for achieving integrated fermentation and denitrification process of the surplus sludge; and finally, effluent from IFD-SBR is pumped into the PNA-SBR by a step-feed mode, the process contains two main running units of aeration and anoxic, ammonia is oxidized into nitrite in aeration stage, and the generated nitrite combined with ammonia contained in secondary influent are further removed through Anammox process.

The objective of the present disclosure is implemented through the following technical solution:
an apparatus and method for synchronously treating sewage and sludge through a step-feed partial nitrification-anaerobic ammonia oxidation process are characterized in that, the apparatus includes a PN-SBR (1), a first middle water tank (2), a sludge storage tank (3), a sludge fermentation and denitrification coupled reactor (4), a second middle water tank (5), an integrated autotrophic nitrogen removal reactor (6), a Programmable Logic Controller (PLC) control system and an online detection device (7).

The PN-SBR (1) is provided with a first stirrer (1.1), a first real-time online monitoring device (1.2), a first water inlet peristaltic pump (1.3), a first water inlet (1.4), a first air compressor (1.5), a first water outlet (1.6) and a first water outlet peristaltic pump (1.7); the first middle water tank (2) is provided with a second water inlet (2.1) and a second water outlet (2.2); the sludge storage tank (3) is provided with a first sludge outlet (3.1); the IFD-SBR (4) is provided with a second stirrer (4.1), a third water inlet (4.3), a first sludge inlet (4.2), a third water outlet (4.4) and a second real-time online monitoring device (4.5); the second middle water tank is provided with a fourth water inlet (5.1) and a fourth water outlet (5.2); the PNA-SBR (6) is provided with a third stirrer (6.1), a third online monitoring device (6.2), a second water inlet peristaltic pump (6.3), a fifth water inlet (6.4), a second air compressor (6.5) and a fifth water outlet (6.6).

The first water inlet peristaltic pump (1.3) is connected with the first water inlet (1.4) of the PN-SBR (1), the first water outlet (1.6) is connected with the second water inlet (2.1) of the first middle water tank (2) through the first water outlet peristaltic pump (1.7), the second water outlet (2.2) of the first middle water tank (2) is connected with the third water inlet (4.3) of the IFD-SBR (4), the first sludge outlet (3.1) of the sludge storage tank (3) is connected with the first sludge inlet (4.2) of the IFD-SBR (4), the third water outlet (4.4) of the IFD-SBR (4) is connected with the fourth water inlet (5.1) of the second middle water tank (5), and the fourth water outlet (5.2) of the second middle water tank (5) is connected with the fifth water inlet (6.4) of the PNA-SBR (6) through the second water inlet peristaltic pump (6.3).

Synchronously treating sewage and sludge through a step-feed partial nitrification coupling anaerobic ammonia oxidation process by utilizing the apparatus includes a following process:

1) A first water inlet peristaltic pump is turned on to pump mature landfill leachate raw water into a PN-SBR with a flow rate of 1 L/min, a first air compressor (DO=0.5 mg/L) and a first stirrer (rpm=100) are turned on, and pH and DO real-time online monitoring indexes in the reactor are counted and summarized by an online monitoring device. As partial nitrification is a biological process of consuming alkalinity, when alkalinity is not consumed anymore, and a pH curve stops falling or an inflection point of ammonia valley point appears, the first air compressor and the first stirrer are turned off to stop aeration and stirring, precipitating is performed for 30 min, and effluent is discharged into a first middle water tank according to a volume ratio of 50%.

2) Surplus sludge in a sludge storage tank coupled with the effluent from PN-SBR are pumped into IFD-SBR simultaneously. As the protonated form of nitrite, free nitrous acid can promote organic carbon sources contained in surplus sludge release into aqueous phase; released organics from sludge is in-situ captured by heterotrophic microorganisms and drive denitrification. Therefore, synchronization treatment surplus sludge and wastewater could be realized in one single system. The denitrification is a process that produces alkalinity, when the pH curve does not rise anymore or an inflection point of nitrite elbow appears, the second stirrer is turned off to stop stirring, precipitating is performed for 2 h, and effluent is discharged into the second middle water tank with the volume exchange ratio of 41.7%.

3) The PNA-SBR includes water inlet, aeration, water inlet, anoxic stirring, precipitation and effluent discharging units. Sewage in the second middle water tank is quickly pumped into the reactor at beginning stages of aeration and anoxic stirring according to a volume ratio of 1.5:1, wherein influent ammonia is oxidized into nitrite in the aeration stage, when has the ammonia valley appears in the pH curve, the second air compressor is turned off to stop aeration; and the generated nitrite in the aerobic stage and ammonia in secondary influent are removed in anoxic stage through Anammox process, when the pH curve does not rise anymore or a first derivative of the pH curve tends to be zero, stirring is stopped, precipitating is performed for 30 min, and effluent is discharged.

Technical Principle

The present disclosure provides an apparatus and method for synchronously treating sewage and sludge through a step-feed partial nitrification coupling anaerobic ammonia oxidation process, which belongs to the field of biological treatment. Ammonia rich mature landfill leachate is pumped into aerobic reactor firstly to realize partial nitrification process; exogenous surplus sludge coupled with the PN-SBR effluent are input to an anoxic reactor for achieving integrated a fermentation and denitrification process; and finally, effluent from the IFD-SBR is pumped into PNA-SBR by a step-feed mode, the process contains two main running units of aeration and anoxic, ammonia is oxidized into nitrite in aeration stage, and the generated nitrite combined with ammonia contained in secondary influent are further removed through Anammox process. The process operates stably and reliably, which not only realizes efficient nitrogen removal from landfill leachate without external carbon source addition, but realizes the purpose of exogenous excess sludge reduction simultaneously.

The apparatus and method for synchronously treating sewage and sludge through combination of step-feed partial nitrification and anaerobic ammonia oxidation of the present disclosure have the following advantages:

1) Through the effective combination of partial nitrification, surplus sludge fermentation-denitrification and step-feed partial nitrification-anaerobic ammonia oxidation, it not only realizes the advanced nitrogen removal from mature landfill leachate without adding carbon source, but also realizes the reduction of exogenous surplus sludge.

2) Compared with a traditional nitrification process ($NH_4^+ \rightarrow NO_3^-$), the partial nitrification process saves 25% of the aeration energy consumption, floating sludge is selected in the PN-SBR in this process, and under the condition of low oxygen aeration, it can not only have a better oxygen dissolving effect, but also promote the complete mixing of substrate and sludge to a certain extent.

3) Organic matter in the surplus sludge is released into aqueous phase by the biocidal effect of free nitrous acid; released organics in-situ drive denitrification process, realize simultaneous treatment of wastewater and surplus sludge in a single system; solves the two major problems of large output of surplus sludge and insufficient carbon sources in the actual sewage treatment plant at one time. 4) The PNA-SBR adopts the operation mode of step-feed and intermittent aeration. On the one hand, it strengthens the full utilization of carbon sources in influent, and on the other hand, it creates the optimal reaction space-time conditions for partial nitrification and Anammox, respectively, facilitating further treatment of ammonia nitrogen released in the fermentation process.

5) The specific reaction time of the PN-SBR, IFD-SBR and the step-feed PNA-SBR are controlled by real time parameters through the online monitoring devices, avoiding unnecessary waste of time and energy.

BRIEF DESCRIPTION OF THE DRAWINGS

FIG. 1 is an apparatus of the present disclosure.

DETAILED DESCRIPTION

The present disclosure is further illustrated in detail below in conjunction with the accompanying drawings and detailed description.

As shown in FIG. 1, an apparatus and method for synchronously treating sewage and sludge through a step-feed partial nitrification-anaerobic ammonia oxidation process are characterized in that, the apparatus includes a PN-SBR (1), a first middle water tank (2), a sludge storage tank (3), a IFD-SBR (4), a second middle water tank (5), an PNA-SBR (6), a Programmable Logic Controller (PLC) control system and an online detection device (7).

The PN-SBR (1) is provided with a first stirrer (1.1), a first real-time online monitoring device (1.2), a first water inlet peristaltic pump (1.3), a first water inlet (1.4), a first air compressor (1.5), a first water outlet (1.6) and a first water outlet peristaltic pump (1.7); the first middle water tank (2) is provided with a second water inlet (2.1) and a second water outlet (2.2); the sludge storage tank (3) is provided with a first sludge outlet (3.1); the IFD-SBR (4) is provided with a second stirrer (4.1), a third water inlet (4.3), a first sludge inlet (4.2), a third water outlet (4.4) and a second real-time online monitoring device (4.5); the second middle water tank is provided with a fourth water inlet (5.1) and a fourth water outlet (5.2); the integrated autotrophic nitrogen removal device (6) is provided with a third stirrer (6.1), a third online monitoring device (6.2), a second water inlet peristaltic pump (6.3), a fifth water inlet (6.4), a second air compressor (6.5) and a fifth water outlet (6.6).

The first water inlet peristaltic pump (1.3) is connected with the first water inlet (1.4) of the partial nitrification reactor (1), the first water outlet (1.6) is connected with the second water inlet (2.1) of the first middle water tank (2) through the first water outlet peristaltic pump (1.7), the second water outlet (2.2) of the first middle water tank (2) is connected with the third water inlet (4.3) of the IFD-SBR (4), the first sludge outlet (3.1) of the sludge storage tank (3) is connected with the first sludge inlet (4.2) of the IFD-SBR (4), the third water outlet (4.4) of the IFD-SBR (4) is connected with the fourth water inlet (5.1) of the second middle water tank (5), and the fourth water outlet (5.2) of the second middle water tank (5) is connected with the fifth water inlet (6.4) of the PNA-SBR (6) through the second water inlet peristaltic pump (6.3).

In the embodiment, specific water for tests is actual mature landfill leachate, and the characteristics are as follows: 2390±159 mg/L of COD, 238±69 mg/L of BOD5, 1636±192 mg/L of $NH_4^+$—N, 0.3±1.2 mg/L of $NO_2^-$—N, 2.8±1.3 mg/L of $NO_3^-$—N, 1750±349 mg/L of TN, 8.3±0.3 pH and 3.5±2.1 mg/L of TP. Surplus sludge is obtained from an actual sewage treatment plant secondary sedimentation tank, and MLSS=21337±2145 mg/L. Effective volumes and effluent discharging ratios of the PN-SBR, IFD-SBR and PNA-SBR are 10 L, 6 L and 10 L, respectively, 50%, 41.7% and 50%.

A specific operation process is as follows.

1) A first water inlet peristaltic pump is turned on to pump mature landfill leachate raw water into PN-SBR with a flow rate of 1 L/min, a first air compressor (DO=0.5 mg/L) and a first stirrer (rpm=100) are turned on, and pH and DO real-time online monitoring indexes in the reactor are counted and summarized by an online monitoring device. As partial nitrification is a biological process of consuming alkalinity, when alkalinity is not consumed anymore, and a pH curve stops falling or an inflection point of ammonia valley point appears, the first air compressor and the first stirrer are turned off to stop aeration and stirring, precipitating is performed for 30 min, and effluent is discharged into a first middle water tank according to a volume ratio of 50%.

2) Surplus sludge in a sludge storage tank coupled with PN-SBR effluent are simultaneously pumped to the IFD-SBR. As the protonated form of nitrite, free nitrite can promote organic carbon sources contained in surplus sludge to release into aqueous phase; the released organics in-situ drive denitrification process, realizing simultaneous treatment of wastewater and surplus sludge in one single system. The denitrification process is a process that produces alkalinity, when the pH curve does not rise anymore or an inflection point of nitrite elbow appears, a second stirrer is turned off to stop stirring, precipitating is performed for 2 h, and effluent is discharged into a second middle water tank according to a volume ratio of 41.7%.

3) The PNA-SBR includes water inlet, aeration, water inlet, anoxic stirring, precipitation and effluent discharging units. Sewage in the second middle water tank is quickly pumped into the reactor at beginning stages of aeration and anoxic by the volume ratio of 1.5:1, wherein influent ammonia is oxidized into nitrite in aeration stage, and when the ammonia valley appears in pH curve, the second air compressor is turned off to stop aeration; and the nitrite generated at the aerobic stage and ammonia in secondary influent are removed in anoxic stage through Anammox process, when the pH curve does not rise anymore, or a first derivative of the pH curve tends to be zero, stirring is stopped, precipitating is performed for 30 min, and effluent is discharged.

Test Results Show that:
an effluent total nitrogen concentration is 15.2 mg/L, a total nitrogen removal rate is 99.2%, and an exogenous surplus sludge reduction rate is 4.2 kg/m³·d. Nitrogen removal contribution efficiencies of the IFD-SBR and PNA-SBR are 85.9% and 10.6%, respectively. In the PNA-SBR, Anammox is the most major nitrogen removal pathway, with the nitrogen removal contribution of 82.1%. Compared with traditional biological nitrogen removal processes, the step-feed partial nitrification-anaerobic ammonia oxidation process can not only reduce 25% of the aeration quantity and 100% of external carbon sources, but also can realize an exogenous sludge reduction efficiency of 50.1%.

What is claimed is:

1. An apparatus for synchronously treating sewage and sludge through a step-feed partial nitrification-anaerobic ammonia oxidation process, comprising a partial nitrification reactor (PN-SBR), a first middle water tank, a sludge storage tank, a sludge fermentation and denitrification coupled reactor (IFD-SBR), a second middle water tank, an integrated autotrophic nitrogen removal reactor (PNA-SBR), a PLC control system and an online detection device; wherein the PN-SBR is provided with a first stirrer, a first real-time online monitoring device, a first water inlet peristaltic pump, a first water inlet, a first air compressor, a first water outlet and a first water outlet peristaltic pump; the first middle water tank is provided with a second water inlet and a second water outlet; the sludge storage tank is provided with a first sludge outlet; the IFD-SBR is provided with a second stirrer, a third water inlet, a first sludge inlet, a third water outlet and a second real-time online monitoring device; the second middle water tank is provided with a fourth water inlet and a fourth water outlet; the PNA-SBR is provided with a third stirrer, a third online monitoring device, a second water inlet peristaltic pump, a fifth water inlet, a second air compressor and a fifth water outlet;

the first water inlet peristaltic pump is connected with the first water inlet of the PN-SBR, the first water outlet is connected with the second water inlet of the first middle water tank through the first water outlet peristaltic pump, the second water outlet of the first middle water tank is connected with the third water inlet of the IFD-SBR, the first sludge outlet of the sludge storage tank is connected with the first sludge inlet of the IFD-SBR, the third water outlet of the IFD-SBR is connected with the fourth water inlet of the second middle water tank, and the fourth water outlet of the second middle water tank is connected with the fifth water inlet of the PNA-SBR through the second water inlet peristaltic pump.

2. A method for synchronously treating sewage and sludge through a step-feed partial nitrification-anaerobic ammonia oxidation three-stage process by applying the apparatus according to claim 1, comprising a following process:

1) Turning on a first water inlet peristaltic pump to pump mature landfill leachate raw water into a PN-SBR with a water inlet flow rate of 1 L/min, turning on a first air compressor and a first stirrer, and counting and summarizing pH and DO real-time online monitoring indexes in the PN-SBR by an online monitoring device;

controlling DO=0.5-0.6 mg/L; and as partial nitrification is a biological process of consuming alkalinity, when alkalinity is not consumed anymore and a pH curve stops falling or an inflection point of ammonia valley point appears, turning off the first air compressor and the first stirrer to stop aeration and stirring, precipitating for 30 min, and discharging effluent into a first middle water tank (2) according to a volume ratio of 50%;

2) Surplus sludge in a sludge storage tank (3) coupled with effluent from the PN-SBR is simultaneously pumped into an IFD-SBR; and when the pH curve does not rise anymore or an inflection point of nitrite elbow appears, turning off a second stirrer to stop stirring, precipitating for 2 h, and discharging effluent into a second middle water tank according to a volume ratio of 41.7%; and 3) the PNA-SBR comprising a second water inlet, aeration, a fifth water inlet, anoxic stirring, precipitation and effluent discharging units; quickly pumping sewage in the second middle water tank into the PNA-SBR at beginning stages of aeration and anoxic by the volume ratio of 1.5:1, wherein influent ammonia is oxidized into nitrite in aeration stage, and when the pH curve stops falling or the ammonia valley point appears in pH curve, turning off the second air compressor to stop aeration; and the nitrite generated in the aeration stage and ammonia in secondary influent are removed by Anammox process in the anoxic stirring stage, when the pH curve does not rise anymore or a first derivative of the pH curve is smaller than 0.1, stopping stirring, precipitating for 30 min, and discharging effluent.

* * * * *